(12) United States Patent
Reinauer et al.

(10) Patent No.: US 11,196,116 B2
(45) Date of Patent: Dec. 7, 2021

(54) BATTERY, IN PARTICULAR A BUTTON BATTERY, AND METHOD OF MANUFACTURING SAME

(71) Applicant: The Swatch Group Research and Development Ltd, Marin (CH)

(72) Inventors: Olga Reinauer, Neuchatel (CH); Michael Stalder, Bellmund (CH)

(73) Assignee: The Swatch Group Research and Development Ltd, Marin (CH)

(*) Notice: Subject to any disclaimer, the term of this patent is extended or adjusted under 35 U.S.C. 154(b) by 200 days.

(21) Appl. No.: 16/543,662

(22) Filed: Aug. 19, 2019

(65) Prior Publication Data

US 2020/0083499 A1  Mar. 12, 2020

(30) Foreign Application Priority Data

Sep. 7, 2018 (EP) ..................... 18193252

(51) Int. Cl.
*H01M 50/183* (2021.01)
(52) U.S. Cl.
CPC ................. *H01M 50/183* (2021.01)
(58) Field of Classification Search
CPC .................................................. H01M 50/183
See application file for complete search history.

(56) References Cited

U.S. PATENT DOCUMENTS

| 2014/0106211 | A1* | 4/2014 | Lee ............... H01M 50/20 429/185 |
| 2016/0336552 | A1 | 11/2016 | Maclean et al. |
| 2017/0149025 | A1 | 5/2017 | Hashimoto et al. |
| 2018/0241013 | A1 | 8/2018 | Vuille et al. |

FOREIGN PATENT DOCUMENTS

| CH | 713 316 A2 | 6/2018 |
| DE | 100 55 373 A1 | 5/2001 |
| DE | 10 2016 207 814 A1 | 11/2016 |
| DE | 10 2016 207 814 A1 | 11/2016 |
| EP | 3 364 479 A1 | 8/2018 |

OTHER PUBLICATIONS

Japanese Office Action dated Sep. 8, 2020 in Patent Application No. 2019-156294 (with English translation), 2 pages.
European Search Report dated Nov. 7, 2018 in European Application 18193252.6, filed Sep. 7, 2018 (with English Translation of Categories of Cited Documents & Written Opinion).

* cited by examiner

*Primary Examiner* — Christopher P Domone
*Assistant Examiner* — Kimberly Wyluda
(74) *Attorney, Agent, or Firm* — Oblon, McClelland, Maier & Neustadt, L.L.P.

(57) ABSTRACT

A method of manufacturing a battery, in particular a button battery, including a case, provided with a container and a cap, and a polymer gasket, in particular made of polypropylene, compressed and bonded between the container and the cap. The method successively includes a step of implanting a silicatised layer by tribochemical sand blasting on all or part of the surface of the gasket, a step of adding a layer of adhesive to the surface of the gasket including the silicatised layer and/or on all or part of the surface of the container and of the surface of the cap intended to be joined to the gasket, a step of assembling the case with the gasket positioned by compression and bonding with the layer of adhesive between the container and the cap.

14 Claims, 2 Drawing Sheets

BATTERY, IN PARTICULAR A BUTTON BATTERY, AND METHOD OF MANUFACTURING SAME

CROSS-REFERENCE TO RELATED APPLICATION

This application claims priority to European Patent Application No. 18193252.6 filed on Sep. 7, 2018, the entire disclosure of which is hereby incorporated herein by reference.

TECHNICAL FIELD

The present invention relates to a method of manufacturing batteries and, in particular, button batteries. It further relates to the battery obtained via the aforementioned manufacturing method.

TECHNOLOGICAL BACKGROUND

Button batteries generally include a case provided with a container and a cap respectively forming the positive and negative poles of the battery. Conventionally, button batteries are sealed with a polymer gasket positioned by compression between the container and the cap. This polymer gasket provides galvanic isolation between the poles and forms a barrier between the electrolyte contained in the battery and the external environment. However, this barrier is not entirely impervious. Under certain conditions, for example excessive humidity, moisture can enter the battery via the interface between the gasket and the case. This results in the premature ageing of the battery and thus in a reduced life of the battery.

Solutions exist for improving the gasket's adhesion to the case of the battery. One solution consists of coating the gasket with adhesive such that it bonds to the respective surfaces of the container and of the cap against which it is pressed. However, the adhesion between the gasket and the adhesive is often not sufficient to prevent fluid from circulating between the interior and exterior of the battery. Within the scope of the present invention, it was found that the primary issue is not the result of poor adherence of the adhesive to the metal forming the case, as a person skilled in the art could have a priori believed, but rather of poor adherence at the interface between the adhesive and the gasket. More specifically, certain polymers such as polypropylene which is widely used for the gaskets incorporated into batteries, have low surface energies which do not allow for the correct adhesion of the adhesive to the gasket.

In general, increasing the surface energy and thus the wettability of these polymers has been proposed, by way of a plasma or corona treatment. However, these treatments have certain drawbacks. The corona treatment has the drawback of being relatively short-lasting. More specifically, the treated surface loses the improved adhesion properties thereof over a time scale of about 24 hours. It is thus necessary to treat and bond the polymer immediately thereafter, without which the adhesion of the adhesive to the polymer will not be sufficient. Plasma treatment requires expensive equipment in a special atmosphere (vacuum, argon or oxygen). Moreover, when vented, the treated surface also loses a part of its features.

It is therefore observed that, thus far, despite research efforts, no entirely satisfactory solution has been able to overcome the problem of sealing batteries in a simple and inexpensive manner.

SUMMARY OF THE INVENTION

The present invention relates to a new method of manufacturing batteries allowing for improved sealing of the batteries and, more specifically, of button batteries including a bonded polymer gasket.

For this purpose, the manufacturing method according to the invention includes, before the step of adding the adhesive layer, a step consisting of implanting, by tribochemical sand blasting on at least one part of the surface of the gasket, a silicatised layer. This silicatisation treatment allows the surface energy of the gasket to be increased and thus the wettability of the adhesive to the gasket. This results in a better adhesion of the adhesive to the gasket, producing an end product with improved sealing of the battery. Compared to corona or plasma treatments, tribochemical sand blasting procures lasting enhanced wettability properties on the surface treated, with no significant change in wettability observed after one month of ageing. Moreover, tribochemical sand blasting has another advantage of being possible in air without the use of expensive equipment.

According to an advantageous alternative embodiment of the method according to the invention, the manufacturing method further includes, between the steps of implanting the silicatised layer and of depositing the layer of adhesive, a step of depositing an adhesion promoter. The adhesion promoter comprises silanes which form a chemical bond with the silicatised layer, and other chemical functions selected depending on the adhesive in order to specifically react with the adhesive deposited. A lasting chemical bond is thus created between the assembly surfaces of the case and the adhesive arranged between these surfaces, producing a strong bond and seal for the battery.

Other features and advantages of the present invention will appear upon reading the following description given of preferred embodiments, provided as non-limiting examples with reference to the accompanying drawings.

DETAILED DESCRIPTION OF THE INVENTION

The present invention relates to a method of manufacturing a battery. It more particularly relates to the steps implemented in order to procure an assembly that is sealed between the container and the cap of the case of the battery. The present invention further relates to the battery, and in particular to the button battery, produced by this manufacturing method.

Figure 1:
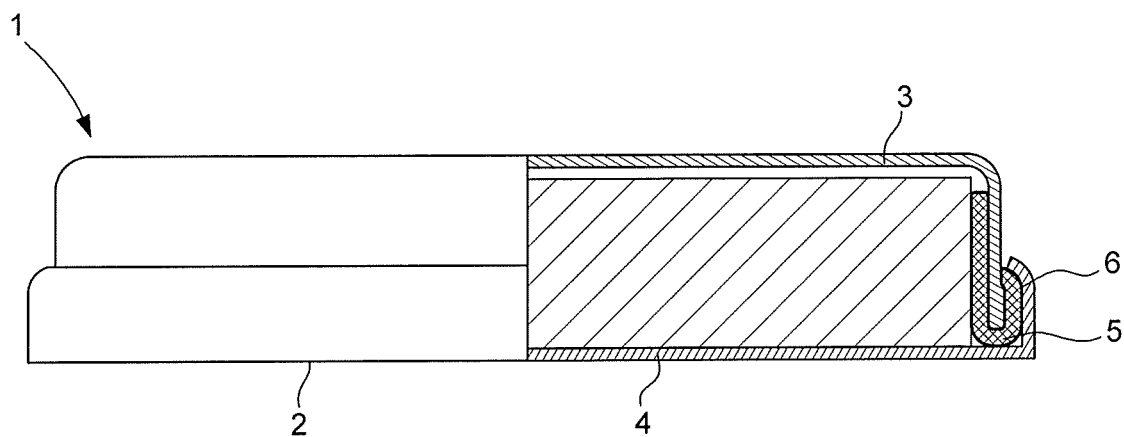
FIG. 1 shows a half-sectional view of a button battery with a case provided with a cap and a container sealed using a polymer gasket treated and bonded according to the manufacturing method of the invention.

The button battery 1 shown in FIG. 1 includes a case 2 formed of a cap 3 and a container 4 respectively forming the negative and positive poles of the battery. Conventionally, the case 2 includes a polymer gasket 5 positioned by compression between the cap 3 and the container 4. This polymer gasket is preferentially made of polypropylene, but can also be made of polyethylene, polyethylene and polypropylene copolymers, or of other polyolefin-based thermoplastic resins. It is bonded to the cap 3 and to the container 4 with a layer of adhesive 6 extending, preferably, over the entire surface of the gasket 5.

According to the invention, during the manufacturing method, a part or, preferably, all of the surface of the gasket has been, prior to bonding, treated by tribochemical sand blasting and optionally functionalised in order to improve the adhesion between the gasket and the layer of adhesive and, thus, the sealing of the battery case. According to the alternative embodiment in FIG. 1, the entire surface of the gasket 5 is subjected to the silicatisation treatment and is optionally functionalised. According to another alternative embodiment, treating only the faces of the gasket intended to be joined with the container and the cap in the bottom part of the case, i.e. where the case is closed, could also be considered. For other battery configurations, this closing area can be located in the top part of the case; in which case, it is this area in the top part of the case that is preferentially treated.

Figure 2:
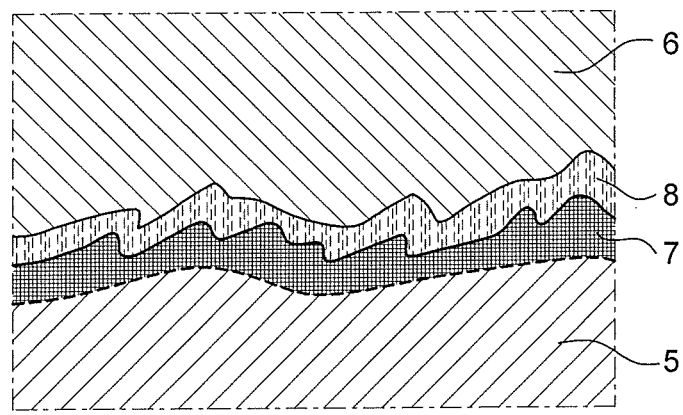
FIG. 2 diagrammatically illustrates the different layers implanted or deposited by the method according to the invention on the surface of the polymer gasket.

As shown in FIG. 2, the surface of the gasket 5 firstly undergoes tribochemical sand blasting, also referred to as silicatisation, which consists of blasting the surface with alumina particles coated in silicon dioxide, also referred to as silica. Typically, the average particle size of the particles lies in the range 10 µm to 100 µm, and preferably in the range 20 µm to 40 µm. Tribochemical sand blasting increases the surface roughness and allows a silicatised layer 7 to be deposited. This layer is present in the form of a dense layer comprising particles implanted in the gasket over a certain thickness on the surface thereof. The layer is seen to be relatively discontinuous and formed of individual particles solidly anchored to the surface of the treated gasket 5. The particles penetrate the surface of the gasket, typically over an average thickness of less than or substantially equal to 50 µm.

As shown hereafter by way of examples, the silicatisation treatment allows the surface energy of the polymer gasket to be significantly increased and thus the wettability of the adhesive on the gasket. This silicatisation treatment is carried out under pressure and time conditions that can be easily determined by a person skilled in the art as a function of the sand blasting equipment available thereto.

Optionally, after tribochemical sand blasting, an adhesion promoter 8, which can also be qualified as a chemical coupling and functionalisation agent, is deposited on the silicatised layer 7 anchored to the surface of the gasket 5. Advantageously, the adhesion promoter comprises silanes, the alkoxyl functions whereof are intended to form a chemical bond with the silicatised layer. It further comprises other organic functional groups such as, for example, acrylates, amines, epoxy, alkyl, acetoxy, aryl, glycol, mercapto, methacryl, vinyl, etc., intended to bond with the adhesive via one or more bonds chosen from strong bonds of the ionic or covalent type and from low interactions of the Van der Waals interactions type, hydrogen bonds, etc. The functionality must be selected such that it is adapted to the chosen adhesive. Thus, for example, an adhesion promoter comprising acrylate groups is privileged when the adhesive is an acrylate adhesive. However, an adhesion promoter comprising amine groups is privileged when the adhesive is an epoxy adhesive. The adhesion promoter and the adhesive are also chosen as a function of the chemical compatibility thereof with the materials used for the interior and for the exterior of the battery.

Finally, the layer of adhesive 6 is deposited on the surface of the previously treated gasket 5 and/or on the surface of the case intended to be joined to the gasket. Acrylate or epoxy adhesives have already been mentioned, however other adhesives can be used, in particular a polyurethane adhesive, to name but one. Preferentially, these are liquid adhesives allowing the gasket to be coated by soaking followed by drying.

Ultimately, the wettability of the adhesive on the surface treated by tribochemical sand blasting and potentially functionalised is improved. The adhesion between the gasket and the adhesive is thus improved. In the presence of an adhesion promoter, the anchoring of the silicatised layer in the gasket combined, on the one hand, with the chemical bonds between the silicatised layer and the adhesion promoter and, on the other hand, with the interactions between the adhesion promoter and the adhesive creates a strong and lasting bond between the adhesive and the gasket.

Moreover, it is specified that the present invention does not exclude the additional treatment of the surfaces of the case intended to be joined to the gasket. These surfaces can undergo a silicatisation and functionalisation treatment, or either a silicatisation or functionalisation treatment only.

The advantages of the method according to the invention will now be illustrated by way of the non-limiting examples described hereinbelow.

EXAMPLES

The effect of the silicatisation on the surface energy of a polypropylene gasket has been determined using contact angle measurements. The effect of the silicatisation and functionalisation on the degradation of the components of the battery has also been determined.

Figure 3:
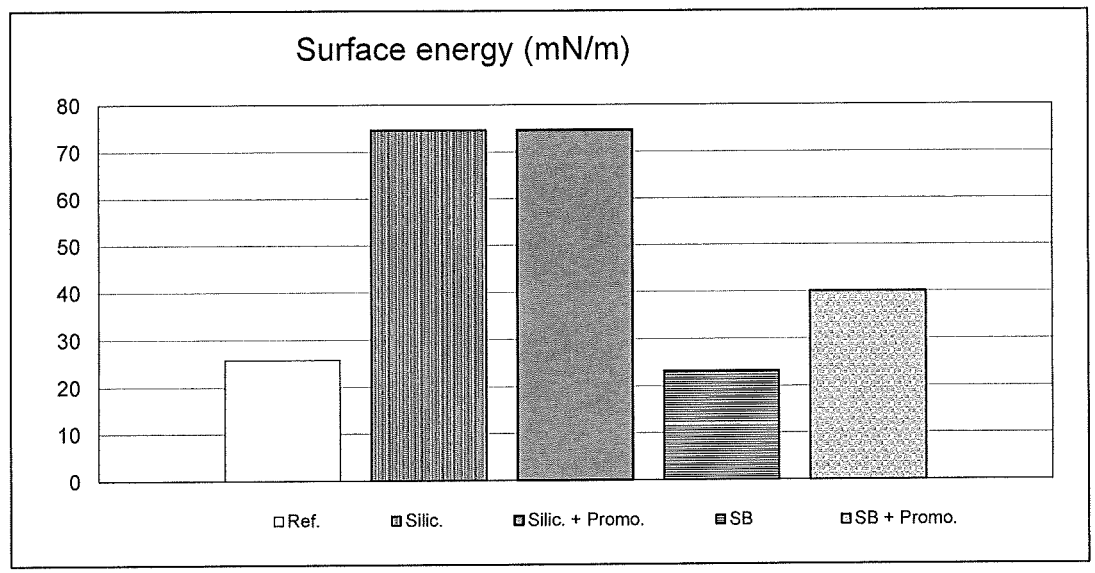
FIG. 3 is a chart showing the surface energy of a polypropylene plate, respectively in the absence of any surface treatment (Ref.), after tribochemical sand blasting according to the invention followed (Silic.+Promo.) or not (Silic.) by a functionalisation treatment, and after conventional sand blasting followed (SB+Promo.) or not (SB) by a functionalisation treatment.

Effect of the Silicatisation on the Surface Energy of the Polymer (FIG. 3)

The surface energy calculations of a commercial polypropylene (PP) marketed by Sigma-Alrich were produced according to the Owens, Wendt, Rebel & Käble (OWRK) method on the basis of contact angle measurements with two liquids (water and diiodomethane) on the PP. Five samples were prepared:

A reference sample made of PP, denoted as Ref. in FIG. 3;
Two comparative examples with a sample made of PP having undergone standard sand blasting, denoted as SB, and one sample made of PP having undergone the same standard sand blasting followed by functionalisation with an adhesion promoter, denoted as SB+Promo.;
Two examples according to the invention with one sample made of PP having undergone silicatisation (sample denoted as Silic.) and with one sample made of PP having undergone silicatisation followed by functionalisation (sample denoted as Silic.+Promo.) with the same adhesion promoter as the comparative example.

Tribochemical sand blasting was carried out with a CoJet Prep™ microblaster using CoJet Sand™ by 3M™ ESPE™ having an average particle size of 30 μm under a pressure of 5 bar. Comparative tests with conventional sand blasting, i.e. sand blasting intended to create a surface roughness but without implantation of a silicatised layer, were carried out with sand having a similar average particle size of 36.5 μm (F280 sand). The adhesion promoter used for the tests includes silane and amine groups (Asusil by The Swatch Group R&D, Polymers division).

The results in FIG. 3 show that silicatisation alone or combined with the adhesion promoter significantly increases the surface energy with values multiplied by 3 compared to the reference sample. The results further show that the increase in surface roughness by standard sand blasting without implantation of a silicatised layer and without subsequent deposition of an adhesion promoter has no effect on the surface energy. It can be concluded therefrom that the silicatised layer implanted by tribochemical sand blasting allows the wettability of the polypropylene surface to be enhanced, resulting in the improved distribution of the adhesive on the gasket and ultimately an improved seal between the parts of the case assembled by bonding. Moreover, contact angle measurements carried out one month after the tribochemical sand blasting of the polypropylene surface have shown that tribochemical sand blasting provides a lasting enhancement of the wettability of the surface.

Figure 4:
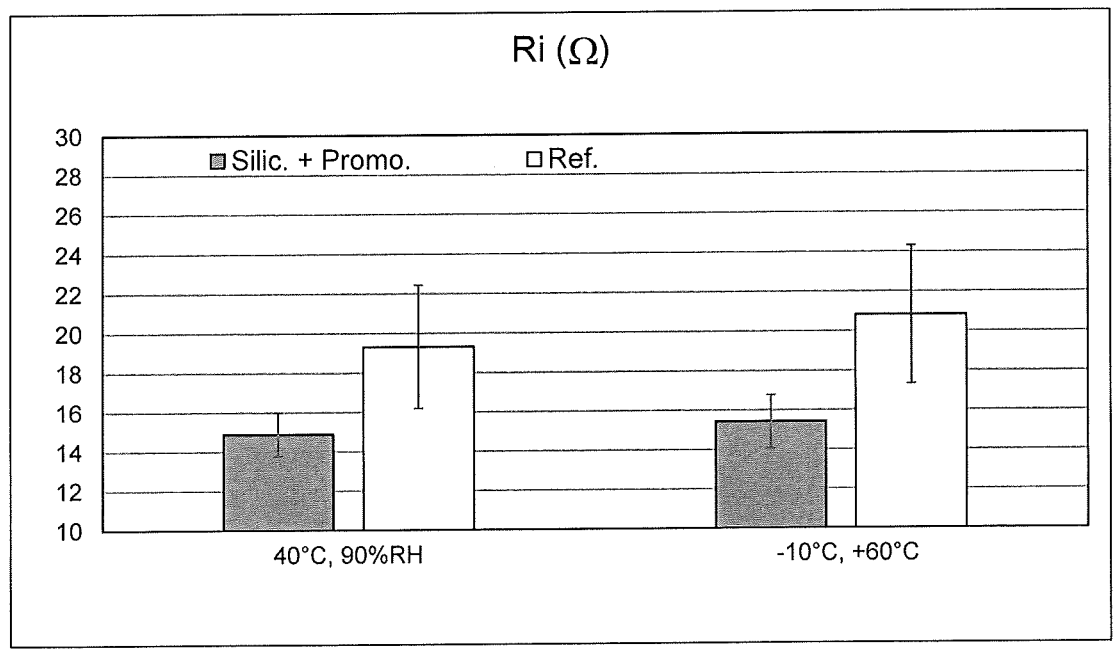
FIG. 4 is a chart showing the internal resistance of the batteries during discharge after ageing treatments of respectively 18 weeks at 40° C. under 90% residual humidity and 18 weeks with thermal cycles varying between −10 and +60° C. The results are presented for batteries comprising a gasket that has been silicatised and functionalised according to the invention (Silic.+Promo.) and batteries comprising a standard gasket (Ref.).

Effect of the Silicatisation and Functionalisation on the Ageing of the Batteries (FIG. 4)

Ageing tests were carried out on two batches of primary lithium batteries of the format CR 2450N assembled using a gasket made of PP. One batch contained a gasket having undergone, over the entire surface thereof, a silicatisation treatment followed by a treatment with an adhesion promoter on the gasket and on the case, the silicatisation conditions and the adhesion promoter being the same as those for the tests on surface energy. Another batch contained a standard gasket made of PP and not silicatised. For the two batches, the gasket was bonded to the steel case using a liquid epoxy adhesive. The batteries, between 6 and 13 per batch, were placed in climatic chambers for 18 weeks with a plurality of batteries from each batch per chamber. Tests were carried out in a chamber at a temperature of 40° C. with 90% residual humidity. Other tests were carried out in a chamber with thermal cycles varying between −10 and +60° C. at ambient humidity. The internal resistances which indicate the degradation of the components of the battery were measured during the discharge at the end of the ageing tests. The average of the measurements per batch is presented in FIG. 4. The results show that the silicatisation and functionalisation treatment (Silic.+Promo.) of the gasket reduces the internal resistance of the batteries after ageing by about 25% compared to a battery comprising a standard gasket (Ref.). It can be deduced therefrom that the seal of the battery is improved thanks to this treatment, which allows the life thereof to be extended.

LEGEND OF THE FIGURES (1) Button battery
(2) Case
(3) Cap
(4) Container
(5) Polymer gasket
(6) Adhesive layer
(7) Silicatised layer
(8) Adhesion promoter layer
Ref.: Reference
SB: Conventional sand blasting
Silic.: Silicatisation
Promo.: Promoter

The invention claimed is:

1. A method of manufacturing a battery, comprising:
a case provided with a container and a cap,
a polymer gasket that is compressed between the container and the cap and bonded to the case in order to seal the case and galvanically isolate the container from the cap;
the method comprising successively:
a step of implanting, by tribochemical sand blasting on a surface of the polymer gasket intended to be joined to the case, alumina particles coated in silica in order to form, on the surface of the polymer gasket, a silicatised layer,
a step of adding a layer of adhesive to the surface of the polymer gasket comprising the silicatised layer and/or on a surface of the container intended to be joined to the polymer gasket and/or on a surface of the cap intended to be joined to the polymer gasket,
a step of assembling the case with the polymer gasket positioned by compression between the container and the cap and bonded to the case with the layer of adhesive.

2. A manufacturing method according to claim 1, further comprising, between the step of implanting a silicatised layer and the step of adding a layer of adhesive, a step of depositing, on the surface of the polymer gasket, a layer of an adhesion promoter comprising silane groups chemically bonding with the silicatised layer.

3. The manufacturing method according to claim 1, wherein the layer of adhesive is liquid during the step of adding the layer of adhesive.

4. The manufacturing method according to claim 1, wherein the layer of adhesive is formed of an epoxy, acrylate or polyurethane adhesive.

5. The manufacturing method according to claim 2, wherein the layer of adhesive is formed of an acrylate adhesive; and wherein the adhesion promoter comprises functional groups intended to bond with said layer of adhesive via one or more bonds, selected from the group consisting of interactions of the ionic or covalent type and weak intermolecular interactions; said adhesion promoter comprising acrylate functional groups and being used in combination with the acrylate adhesive.

6. The manufacturing method according to claim 2, wherein the layer of adhesive is formed of an epoxy adhesive; and wherein the adhesion promoter comprises functional groups configured to bond with said layer of adhesive via one or more bonds, selected from the group consisting of interactions of the ionic or covalent type and weak intermolecular interactions; said adhesion promoter comprising amine functional groups and being used in combination with the epoxy adhesive.

7. The manufacturing method according to claim 1, wherein the step of implanting a silicatised layer is carried out by tribochemical sand blasting with alumina particles coated in silica having an average particle size that lies in the range 20 μm to 40 μm.

8. The manufacturing method according to claim 1, wherein the surface of the container and/or the surface of the cap intended to be joined to the gasket also undergoes tribochemical sand blasting with alumina particles coated in silica before the step of adding the layer of adhesive.

9. The manufacturing method according to claim 2, wherein the surface of the container and/or the surface of the cap intended to be joined to the gasket also undergoes a step of depositing a layer of an adhesion promoter before the step of adding the layer of adhesive when the layer of adhesive is added on the surface of the container and/or the surface of the cap, otherwise before the step of assembling the case with the polymer gasket.

10. The manufacturing method according to claim 1, wherein the polymer gasket is made of polypropylene, polyethylene or of polypropylene and polyethylene copolymers.

11. The manufacturing method according to claim 1, wherein the step of implanting includes the tribochemical sand blasting on all of the surface of the polymer gasket intended to be joined to the case.

12. The manufacturing method according to claim 1, wherein the step of implanting includes the tribochemical sand blasting on part of the surface of the polymer gasket intended to be joined to the case.

13. The manufacturing method according to claim 1, wherein the polymer gasket is made of a polyolefin-based thermoplastic resin.

14. The manufacturing method according to claim 8, wherein the surface of the container and/or the surface of the cap intended to be joined to the gasket undergoes a step of depositing a layer of an adhesion promoter after the step of tribochemical sand blasting and before the step of adding a layer of adhesive when the layer of adhesive is added on the surface of the container and/or the surface of the cap, otherwise before the step of assembling the case with the polymer gasket.

* * * * *